United States Patent [19]

Sugimori et al.

[11] Patent Number: 4,491,658
[45] Date of Patent: * Jan. 1, 1985

[54] METHOD FOR TREATING EMULSIFIED LATEX

[75] Inventors: Teruhiko Sugimori; Hideaki Habara, both of Ohtake, Japan

[73] Assignee: Mitsubishi Rayon Co., Ltd., Tokyo, Japan

[*] Notice: The portion of the term of this patent subsequent to Jan. 31, 2001 has been disclaimed.

[21] Appl. No.: 551,894

[22] Filed: Nov. 15, 1983

Related U.S. Application Data

[63] Continuation-in-part of Ser. No. 378,331, May 14, 1982.

[30] Foreign Application Priority Data

May 15, 1981 [JP] Japan ................................. 56/73115

[51] Int. Cl.³ ............................................. C08F 6/22
[52] U.S. Cl. ................................... 528/486; 528/487; 528/488; 528/490; 528/503; 523/335

[58] Field of Search ............... 528/488, 487, 486, 503, 528/490; 523/335

[56] References Cited

U.S. PATENT DOCUMENTS

4,429,114 1/1984 Sugimori et al. ............... 528/488 X

Primary Examiner—Joseph L. Schofer
Assistant Examiner—S. Babajko
Attorney, Agent, or Firm—Oblon, Fisher, Spivak, McClelland & Maier

[57] ABSTRACT

There is disclosed a method for treating an emulsified latex which comprises discharging an emulsified latex containing particles of 1 $\mu$m or less in diameter into a coagulation solution from fine tubes which satisfy $L/D \geq 0.065\,Re$ (L: length of fine tube, and D: equivalent diameter of fine tube and Re: Reynolds number) at a Reynolds number of 300 or less to coagulate the latex and washing and drying the coagulated latex to obtain a particulate of high bulk specific gravity containing substantially neither fine powders nor coarse particles or a pellet-like product.

11 Claims, 1 Drawing Figure

METHOD FOR TREATING EMULSIFIED LATEX

CROSS REFERENCE TO THE RELATED APPLICATION

This is a continuation-in-part of application Ser. No. 378,331 filed on May 14, 1982.

BACKGROUND OF THE INVENTION

This invention relates to a method for treating emulsified latexes.

Emulsified latexes are generally in the state of dispersed solid particles of 1 μm or less and since the particles are very small, industrially, it is difficult to separate and collect the solid particles as they are. Therefore, inorganic salts or acids are added to the emulsified latex or conversely the emulsified latex is added to aqueous solutions of inorganic salts or acids to once coagulate the emulsified latex and thereafter the coagulated latex is solidified by elevation of temperature and is collected as a particulate.

However, the thus obtained particulate has the following various problems to be solved.

(1) Problem of fine powders

The particulate obtained by the conventional coagulation methods is in grape cluster-like aggregations of emulsified latex particles of 1 μm or less, which are aggregated by mere van der Waals forces and so have a weak binding power between the constituting particles which easily disintegrate to produce large amounts of fine powders during passing the steps. Therefore, various problems occur such as clogging of filter fabric during dehydration, reduction of washing efficiency, contamination of the working environment due to scattering of the fine powders during drying or transportation, dust explosion, etc. A large amount of equipment is required to solve these problems and furthermore dust collectors such as cyclones, bag filters, etc. must be of excessively large size. In order that the particles do not scatter and can be collected by cyclones of proper size, it is desired that the particulate does not contain fine powders of 53 μm or less. Thus, development of a method for preparing particulate containing no such fine powders has been demanded.

(2) The problem of coarse particles

Production of coarse particles at coagulation causes various problems. For example, removal of impurities is difficult and quality is reduced; much air is required to fluidize the particulate during drying or transportation, water removal resistance in particles during drying reduces drying speed to necessitate a long drying time; etc. Considering these problems and problem of blending with other resins, it is generally undesirable for the particulate to contain particles of greater than 1.5 mm in diameter and desirably all particles should be of 1.0 mm or less in diameter.

(3) Increase in bulk specific gravity

When bulk specific gravity of the particulate is small, large storage vessels are required which increase storage costs and furthermore only a small amount of the particulate can be transported by one vessel to cause increase in transportation costs. Moreover, small bulk specific gravity causes scatter of particles or reduction of fluidity.

Since the particulate obtained by the conventional coagulation method is a grape cluster-like aggregation of emulsified latex particles of 1 μm or less, the particulate has many voids and there is a limit in making the specific gravity higher even if coagulation conditions are variously changed. For example, in the case of rubbery resins, the limit of bulk specific gravity is 0.35 g/cm$^3$ and it is desired to produce an integral particulate having no voids with a bulk specific gravity of 0.4 g/cm$^3$ or more.

(4) Reduction of wet powder water content

When emulsified latex is coagulated, then dehydrated and dried to obtain a particulate, the wet powder water content at the dehydration has a direct effect on the energy required for drying. Various trials to reduce the wet powder water content, e.g., selection of dehydrators have been made, but there is a limit depending on coagulation methods. Especially in the case of grape cluster-like particulate of emulsified latex particles of 1 μm or less as obtained by the conventional coagulation methods, the particulate has many voids and contains a large amount of water. Thus, it is desirable for the particulate to comprise coalescent emulsified latex particles having very few voids. For example, in the case of graft copolymer resins of polybutadiene with styrene and acrylonitrile or graft copolymer resins of polybutadiene with styrene and methylmethacrylate, particulate produced by the conventional coagulation method has a wet powder water content of more than 30% (dry base) and it is desired to further reduce this water content to save drying energy.

(5) Others

Recently, fluidity of particulate which decides the possibility of using automatic meters has become important. Especially, from the labor-saving viewpoint, there is an increasing tendency to use automatic meters in various devices while use of the automatic meters is limited in the case of the particulates produced by the conventional coagulation method. Thus, it is desired to make further labor-saving by improving fluidity of particulates. Besides there are still many problems to be solved such as particle size distribution, shape of particles, etc.

Therefore, it is desired that particulates obtained using a coagulation method contain neither fine powders of 53 μm or less coarse particles of 1.5 mm or more preferably of 1.0 mm or more and having a bulk specific gravity of at least 0.4 g/cm$^3$ and that they have a wet powder water content at dehydration of 20% or less for saving drying energy.

Many attempts have been made to solve these problems which originate from coagulation methods, but none of them have completely overcome these problems. Recently, there has been proposed to simultaneously carry out coagulation and granulation of polymer latex in a vapor phase and it has been reported that said problems were nearly completely solved. However, this method still has problems to be solved, namely, since coagulation and granulation are simultaneously effected in a vapor phase, large and complicated equipment is required, control of operations is intricate, fine powders are apt to be formed because of the injection of latex into the vapor phase, particulates of large particle diameter cannot be produced because the size of droplets at injection is the maximum of particle size of particulate obtained therefrom.

The inventors have conducted intensive research to solve these problems and attained this invention.

SUMMARY OF THE INVENTION

The objects of this invention are accomplished by discharging an emulsified latex containing particles of 1 μm or less in diameter into a coagulation solution from fine tubes which satisfy L/D ≧ 0.065 Re (L: length of the tube, D: equivalent diameter of the tube and Re: Reynolds number) under the condition of Reynolds number of 300 or less to coagulate the latex, washing and drying the coagulated latex to obtain a particulate containing substantially neither fine powders nor coarse particles and which is high in bulk specific gravity or a pellet-like molded product.

DESCRIPTION OF PREFERRED EMBODIMENT

When emulsified latex containing particles of 1 μm or less is gently discharged without forced injection into a coagulation liquid from fine tubes, slits, dies, etc. which satisfy the relation L/D ≧ 0.065 Re under conditions of the Reynolds number of 300 or less, preferably 100 or less, there are obtained soft aggregations which have various shapes such as string-, thread-, sheet-, or ball-like shape depending on the shape of the discharge orifice and discharge method and which are covered with apparently coagulated soft skin. When the skin of the surface of the soft aggregation is gently broken, it is found that there are many particles of 60 to 500 μm in diameter each of which is formed by coalescing of the emulsified latex particles.

Figure 1:
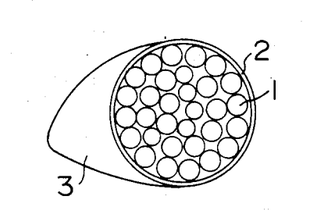
The FIGURE is an enlarged sectional view of a soft aggregation comprising coalescent particles which is obtained by this invention.

The accompanying drawing shows an enlarged sectional view of a soft aggregation composed of coalescent particles obtained in accordance with this invention, wherein 1 indicates coalescent particle of 60 to 500 μm in diameter formed by coalescense of emulsified latex particles of 1 μm or less, 2 a surface skin of the soft aggregation composed of the coalescent particles and 3 the soft aggregation. The coalescent particles constituting the soft aggregation are fragile ane easily broken down to the size of the emulsified latex particles by external force. However, when the aggregation is heated without breaking the surface skin or the coagulation conditions are made more severe by increasing concentration of coagulation solution to solidify the aggregation to some extent, the strength of the coalescent particles of 60 to 500 μm is increased and they are not broken even if a considerably large external force is applied.

When the surface skin of the aggregation in this state is broken and ruptured by a shearing force, e.g., by agitation, there is formed a slurry in which the coalescent particles are dispersed and this slurry, if necessary solidified by elevation of temperature, is subjected to filtration and solid deposited is washed and then dried to obtain a particulate of high bulk specific gravity containing neither fine powders of 53 μm or less nor coarse particles of more than 1.5 mm. Furthermore, it is also possible to obtain a particulate of high bulk specific gravity containing neither fine powders nor coarse particles by solidifying said aggregation as it is without breaking the skin and forming the slurry.

Thus, it is the important point of this invention to produce a soft aggregation composed of particles of 60 to 500 μm which are formed by coalescence of emulsified latex particles of 1 μm or less. In order to form the coalescent particles of 60 to 500 μm, it is necessary that flow of emulsified latex is previously aligned to laminar flow state and that this is gently discharged into a coagulation bath without causing forced injection at the point of contact with the coagulation bath. It was reported by Boussinesq that in order to previously align a flow to laminar flow state in a fine tube a run-up distance (starting length or entry length) is required before the flow reaches complete laminar flow state after entering the fine tube, said run-up distance of laminar flow satisfying the formula L l/D ≧ 0.065 Re where L l is the run-up distance for laminar flow, D is diameter of the fine tube and Re is the Reynolds number of the liquid flowing through the fine tube.

If Reynolds number of flow in the fine tube is increased and the length of the fine tube as a run-up distance for laminar flow does not satisfy said formula, no particles of 60 to 500 μm which are formed by coalescence of emulsified latex particles are seen in the soft aggregation even if the latex is not forcefully injected into the coagulation bath from the discharging hole and the aggregation becomes that of the emulsified latex particles per se. If the Reynolds number is decreased, also particles of 60 to 500 μm are not formed in the soft aggregation when the latex is gently discharged into a coagulation bath from a fine tube the length of which is shortened so that the formula L/D ≧ 0.065 Re is not satisfied. Furthermore, even if a fine tube having sufficient run-up distance for laminar flow is used, there is a limit in flow velocity in such a fine tube and a Reynolds number of 100 or less provides stable coalescent particles, about 200 or more provides somewhat unstable particles and more than 300 provides substantialy no coalescent particles because the latex is forcefully injected into the coagulation bath.

Therefore, a soft aggregation composed of coalescent particles of 60 to 500 μm which are formed by coalescence of emulsified latex particles can be obtained by gently discharging emulsified latex into a coagulation solution using a fine tube having the run-up distance for laminar flow which was reported by Boussinesq (namely, a fine tube satisfying the formula L/D ≧ 0.065 Re) at a Reynolds number of liquid in fine tube of 300 or less, preferably 200 or less, more preferably 100 or less.

Any apparatus for discharging emulsified latex into a coagulation solution such as nozzles, slits, dies, etc. may be used as long as the emulsified latex can be aligned to a complete laminar flow therein and can be gently discharged into a coagulation solution without any forcible injection. Thus formed lump soft aggregation covered with a soft skin which is apparently coagulated can have various shapes such as thread-, string-, rosary-, sheet-, ball-, plate-like shapes depending on the kind of discharging apparatus. The coagulation bath may be a static bath or a bath agitated to such a degree that the soft aggregation is not apparently ruptured.

In order that the coalescent particle of 60 to 500 μm in diameter which is a constituting unit of the soft aggregation is not easily ruptured, the coagulation conditions must be made severe and this is attained by elevation of the coagulation bath temperature, addition of additional coagulants, etc. Unless the soft aggregation is once somewhat solidified in this way and then disintegrated, the minimum constituting coalescent particle of 60 to 500 μm is ruptured into emulsified latex particles of 1 μm or less to result in a particulate containing fine powders of 53 μm or less. On the other hand, if the soft aggregation is solidified too much, the aggregation is difficult to disintegrate and disintegration conditions must be made severer. These disintegration conditions may vary depending on concentration of the coagulation bath, coagulation temperature, degree of solidification, kind of emulsified latex, kind of additives, shapes of the objective particulate, but the condition may be such that the surface skin of the lump aggregation composed of the coalescent particles of 60 to 500 μm can be torn and broken. For example, in the case of agitator of agitation tank type which is commonly employed, such conditions as providing flows of at least 1000, preferably at least 3000 in Reynonds number are required.

For some object, it is also possible to produce particulate of high bulk specific gravity having neither fine powders nor coarse particles by forming aggregations of shape and size suitable to the object and solidifying them as they are. Moreover, thus solidified particulate may also be dried and then disintegrated.

For still another object, it is also possible to discharge the latex in strand form into a coagulation solution from fine tubes. For this purpose, it is necessary to use a fine tube which satisfies $L/D \geq 0.1$ Re and $L/D \geq 20$ (L: length of the tube, D: equivalent diameter of the fine tube and Re: Reynolds number) under the conditions of Reynolds numbers of 200 or less. Thus obtained strand-like products may be cut as they are into pellets or, if necessary, the strands may be solidified by elevation of temperature or making the coagulation conditions severer, melting them and cutting them into pellets. Thus, the pellets can be produced more advantageously than by the conventional methods from the points of saving of energy and simplification of steps.

The concentration of coagulant in the coagulation bath into which the emulsified latex is discharged may be within the range employed in the conventional coagulation methods. However, when the concentration is too low, uncoagulated latex floats to cause production of fine powders and when too high, removal of impurities is difficult causing reduction of performance of products. Therefore, concentration of coagulant should be controlled to optimal conditions. For example, when emulsified latex of a graft copolymer of polybutadiene with styrene and acrylonitrile containing 30 to 50% by weight of solid matter is coagulated with sulfuric acid, sulfuric acid is used as 0.01 to 5.0, preferably 0.1 to 3.0% by weight aqueous solution and when the coagulant is magnesium sulfate this is used as 0.1 to 10, preferably 1 to 5% by weight aqueous solution. When emulsified latex of a graft copolymer of polybutadiene with styrene and methyl methacrylate which contains 30 to 50% by weight of solid matter is coagulated with sulfuric acid, this coagulant is used as 0.005 to 1, preferably 0.01 to 0.5% by weight aqueous solution and when the coagulant is magnesium sulfate, this is used as 0.01 to 5, preferably 0.1 to 0.5% by weight aqueous solution. Furthermore, when the latex cannot be easily coagulated with above-mentioned coagulant, the coagulant comprising sulfuric acid and inorganic salt is preferably used in the range of 0.1 to 10% by weight aqueous solution.

Temperature of coagulation bath may be within the range at which coagulation can be performed, but generally the following usual method may be employed, namely, coagulation at above 10° C., previous solidification at 30° to 90° C. and subsequent further solidification at a temperature higher than the heat deformation temperature of resin by 5° to 20° C.

Most of polymer latexes which can be obtained and recovered by emulsion polymerization can be used as emulsion latexes in this invention. As especially effective emulsified latexes, mention may be made of latexes obtained by emulsion polymerization of ethylenic monomers, rubber-like polymer latexes, latexes obtained by graft polymerization of rubber-like polymers with ethylenic monomers and mixtures of these latexes. As more especially effective emulsified latexes, the emulsified latexes described in, for example, U.S. Pat. Nos. 3,591,657, 3,644,249, 3,651,175, 3,856,894, 3,925,510, 4,035,443, 4,052,482, 4,128,605, 4,362,845 etc. can also be used for obtaining impact modifiers or processing aids. The disclosure in the Specifications of these patents is incorporated herewith by reference.

As the ethylenic monomers, mention may be made of styrene monomers such as styrene, α-methylstyrene, o-ethylstyrene, o-chlorostyrene, p-chlorostyrene, divinylbenzene, etc., acrylonitrile monomers such as acrylonitrile, vinylidene cyanide, etc., acrylic acid or acrylic esters such as methyl acrylate, ethyl acrylate, etc., methacrylic acid or methacrylic esters such as methyl methacrylate, ethyl methacrylate, etc., vinyl esters such as vinyl acetate, etc., vinylidenes such as vinylidene chloride, etc., vinyl halides such as vinyl chloride, etc., vinyl ketones, acrylic amides, maleic anhydride, etc. These monomers may be used alone or as mixtures.

As the rubber-like polymers, mention may be made of natural or synthetic rubber-like polymers such as natural rubber, butadiene rubber, styrene-butadiene copolymers, acrylonitrile-butadiene copolymers, isoprene rubber, chloroprene rubber, acrylic rubber, ethylene-vinyl acetate copolymer, etc.

As the coagulants for polymer latexes, all of the generally used acids and water soluble inorganic salts may be used. The acids include mineral acids such as sulfuric acid, hydrochloric acid, etc. and organic acids having a dissociation constant of at least $10^{-6}$ mol/l such as acetic acid, etc. (including benzoic acid, salicylic acid, formic acid, tartaric acid) and the salts includes sulfates such as magnesium sulfate, sodium sulfate, etc., chlorides, acetates, etc. Mixtures of them may also be used.

Known additives such as dispersants, lubricants, thickening agents, surfactants, plasticizers, antioxidants, coloring agents, foaming agents, etc. may be previously added to the polymer latex. Especially the dispersants sometimes have a great effect on formstability of secondary particles produced upon coagulation. As the dispersants, there may be used inorganic and organic dispersants generally used as stabilizers in emulsion polymerization or suspension polymerization. The inorganic dispersants include magnesium carbonate, tribasic calcium phosphate, etc. Natural and synthetic high-molecular dispersants among the organic dispersants include starch, gelatin, acrylamide, partially saponified polyvinyl alcohol, partially saponified polymethyl methacrylate, polyacrylic acid and salts thereof, cellulose, methylcellulose, polyalkylene oxide, polyvinylpyrrolidone, polyvinylimidazole, sulfonated polystyrene, etc. Low-molecular dispersants include common emulsifiers such as alkylbenzene sulfonates, fatty acid salts, etc.

Furthermore, formation of secondary particles can be made easy and particle shape can be controlled by the addition of starch syrup, paraffins, etc. as the thickening agents.

In the following examples, all percents are by weight and the water content is % based on dry powders.

EXAMPLE 1

Styrene and acrylonitrile were great copolymerized with polybutadiene to obtain an emulsified latex (solid content 45%, viscosity 0.1 poise and density 1 g/cm$^3$) of 0.2 μm in mean particle diameter which comprised 45% of polybutadiene, 39.1% of styrene and 15.9% of acrylonitrile. This emulsified latex was discharged into a 1% aqueous sulfuric acid solution at 30° C. from fine tubes of 0.7 mm in inner diameter and 1 cm in length at a linear speed of 50 to 100 cm/sec. Reynolds number in the fine tube at this time was 35 to 70 and run-up distance necessary for laminar flow was 0.32 cm. Thus, the conditions for forming laminar flow were sufficiently satisfied. The emulsified latex became soft aggregations of 300 to 600 μm having apparently coagulated surface skins. When the skin was gently broken by a needle tip it was found that coalescing particles of 100 to 200 μm were present in the form of a coherent clump like cod's-roe. The solution was heated, as it was, to 95° C., left to stand for 10 minutes and thereafter filtered, and solid matter was washed with water, dehydrated and then dried to obtain a particulate. This particulate had a mean particle diameter of 400 μm and contained neither fine powders of 100 μm or less nor coarse particles of 1.0 mm or more. It had a high bulk specific gravity of 0.5 g/cm$^3$ and a low wet powder water content of 15%. This was an ideal particulate.

EXAMPLE 2

Example 1 was repeated except that the linear speed of the flow of emulsified latex in the fine tube was increased to 200 cm/sec. Under this condition, Reynolds number in the fine tube was 140, the necessary run-up distance for laminar flow was 0.64 cm and thus the latex could be completely aligned to laminar flow. When the skin of a soft aggregation formed in the coagulation solution was broken, coalescent particles of 100 to 200 μm were present in the form of a coherent clump. The obtained particulate had a mean particle diameter of 350 μm, contained neither fine powders of 53 μm or less nor coarse particles of 700 μm or more and had a high bulk specific gravity of 0.45 g/cm$^3$ and a very low wet powder water content of 19% at dehydration.

EXAMPLE 3

Example 1 was repeated except that the linear speed of the emulsified latex flow in the fine tube was increased to 300 cm/sec. Under this condition, Reynolds number in the fine tube was 210, the necessary run-up distance for laminar flow was 0.96 cm and thus the flow in the fine tube was aligned to laminar flow. When the skin of a soft aggregation in the coagulation bath was broken coalescent particles of 100 to 150 μm were present in the form of a coherent clump. The obtained particulate has a mean particle diameter of 300 μm, contained neither fine powders of 53 μm or less nor coarse particles of 700 μm or more and had a high bulk specific gravity of 0.42 g/cm$^3$ and a very low wet powder water content of 20% at dehydration.

REFERENCE EXAMPLE 1

The same emulsified latex as used in Example 1 was added into a 2% aqueous sulfuric acid solution (amount of sulfuric acid used per resin was 5%) and was heated to 96° C. to coagulate the latex. The coagulated latex was filtered off, washed with water, then dehydrated and dried to obtain particulate. This particulate was an aggregation in which the particles had a mean diameter of 200 μm, contained 13% of fine powders of 53 μm or less, had a bulk specific gravity of 0.34 g/cm$^3$ and had a wet powder water content at dehydration of 32%. The particulate was of indefinite shape and was very low in fluidity.

REFERENCE EXAMPLE 2

Reference Example 1 was repeated except that the linear speed of emulsified latex flow in the fine tube was increased to 400 cm/sec. Under this condition, Reynolds number in the fine tube was 280, but the necessary run-up distance for laminar flow was 1.3 cm. Thus, the length of the fine tube of 1 cm was insufficient. A mixture of some emulsified products and soft aggregations was formed from the emulsified latex discharged from the fine tubes. The soft aggregation was taken out and the skin was broken by a needle tip to find substantially no coalescent particles. Parciculate obtained from the solution in the same manner as in Example 1 contained 10% of fine powders of 53 μm or less and had a very low bulk specific gravity of 0.31 g/cm$^3$. Wet powder water content at dehydration was 32% which was high.

EXAMPLE 4

The same emulsified latex as used in Example 1 was discharged into a 1% aqueous sulfuric acid solution at 30° C. from fine tubes of 2 mm in inner diameter and 1 cm in length at a linear speed of 10 to 20 cm/sec. Reynolds number in this fine tube at this time was 20 to 40, the necessary run-up distance for laminar flow was 0.52 cm and thus the flow was sufficiently aligned to laminar flow. The emulsified latex become string-like soft aggregations of 1 to 2.5 mm having apparently coagulated surface. The aggregation was taken out and the skin was broken by a needle tip to find coalescent particles of 200 to 300 μm in the form of a coherent clump. The solution was heated to 80° C. to solidify the aggregations and left to stand for 10 minutes. Then, the solution was agitated by a propeller type agitator with two blades of 10 cm in diameter at a revolution speed of 800 rpm to disintegrate the aggregations. Apparent viscosity was 1 poise and Reynold number was about 1300. The slurry obtained by such distintegration and dispersion was heated to 95° C. to further solidify the disintegrated aggregations and they were filtered off, washed, dehydrated and dried to obtain particulate.

Thus obtained particulate had a mean particle diameter of 300 μm and contained neither fine powders of 53 μm or less or coarse particles of 1 mm or more. It had a bulk specific gravity of 0.43 g/cm$^3$ and a low wet powder water content of 19.5% at dehydration.

EXAMPLE 5

Example 4 was repeated except that fine tubes of 2 mm in inner diameter and 3 cm in length were used and linear speed in the tube was 100 cm/sec. Reynolds number in the fine tube at this time was 200 and the necessary run-up distance for laminar flow was 2.6 cm, and thus the flow was sufficiently aligned to laminar flow. The emulsified latex discharged into coagulation solution became soft aggregations of 1 to 3 mm. When surface skin was broken, coalescent particle of 150 to 300 μm in the form of a coherent clump were observed. Particulate obtained in the same manner as in Example 4 had a mean diameter of 350 μm, contained neither fine powders of 53 μm or less nor coarse particles of 1.5 mm or more and had a bulk specific gravity of 0.40 g/cm³ and a low wet powder content of 20% at dehydration.

REFERENCE EXAMPLE 3

Example 4 was repeated except that the flow velocity in the fine tube was increased to 50 cm/sec. The Reynolds number in the fine tube at this time was 100 and the necessary run-up distance for laminar flow was 1.3 cm. The length of the fine tube did not meet this condition. Emulsified latex discharged into the coagulation solution under such conditions partially floated in the form of latex and when skin of the formed lumps was broken, substantially no coalescent particles were seen. Particulate obtained by heating, disintegrating and solidifying with heat in the same manner as in Example 4 had a mean particle diameter of 280 μm and contained 13% of fine powders of 53 μm or less and no coarse particles of 1 mm or more, but had a small bulk specific gravity of 0.28 g/cm³ and a high wet powder water content of 33% at dehydration.

EXAMPLE 6

Emulsified latex (mean particle diameter 0.1 μm, solid content 45%; viscosity 0.1 poise and density 1 g/cm³) which comprised 50% of butadiene component, 20% of styrene component and 30% of methyl methacrylate component was prepared by graft copolymeization of a styrene-butadiene copolymer with styrene and methyl methacrylate. This emulsified latex was discharged into a 0.2% aqueous sulfuric acid solution at 30° C. from fine tubes of 0.7 mm in inner diameter and 1 cm in length at a linear speed of 50 to 100 cm/sec. Reynolds number in the fine tube at this time was 35 to 70, the necessary run-up distance for laminar flow was 0.32 cm and the flow in the fine tube was sufficiently aligned to laminar flow. The emulsified latex discharged into the coagulation solution became soft aggregations of 400 to 700 μm surface of which was apparently coagulated. When surface skin of the soft aggregations taken out was broken by a needle tip, it was found that coalescent particles of 200 to 300 μm were present in the form of a coherent clump. The solution, as it was, was heated to 85° C. and left to stand for 10 minutes and the aggregations were filtered off, washed with water, dehydrated and dried to obtain a particulate.

Thus obtained particulate had a mean particle diameter of 500 μm, contained neither fine particles of 100 μm or less nor coarse particles of 1.0 mm or more and, had a high bulk specific gravity of 0.43 g/cm³ and a very low wet powder water content of 17% at dehydration.

EXAMPLE 7

The same emulsified latex as used in Example 6 was discharged into a 0.2% aqueous sulfuric acid solution at 30° C. from fine tubes of 2 mm in inner diameter and 1 cm in length at a linear speed of 10 to 20 cm/sec. The Reynolds number in the fine tube at this time was 20 to 40, the necessary run-up distance for laminer layer was 0.52 cm and the flow in the fine tube was sufficiently aligned to laminar flow. The emulsified latex in the coagulation solution became string-like lumps of 1.5 to 3 mm the surface of which was apparently coagulated. When the surface skin of the lumps taken out was gently broken by a needle tip, coalescent particles of 200 to 300 μm in the form of a coherent clump were found. The solution was heated to 70° C. to solidify the lumps and left to stand for 10 minutes. Then, the lumps were disintegrated by a propeller type agitator of 10 cm in diameter at a revolution speed of 800 rpm. The apparent viscosity of the solution was 1 poise and the Reynolds number was about 1300. The thus disintegrated and dispersed slurry was heated to 85° C. to further solidify the disintegrated lumps, which were filtered off, washed, dehydrated and dried to obtain a particulate.

The particulate had a mean particle diameter of 400 μm, contained neither fine powders of 53 μm or less nor coarse particles of 1 mm or more and had a high bulk specific gravity of 0.44 g/cm³ and a wet powder water content of 18% at dehydration.

REFERENCE EXAMPLE 4

The same emulsified latex as used in Example 6 was added to a 0.2% aqueous sulfuric acid solution so that the amount of sulfuric acid per resin was 1.5% to coagulate the latex. The coagulated latex was filtered off, washed with water, dehydrated and dried to obtain a particulate. This particulate had an entirely indefinite shape and one particle was an aggregation of fine particles which was a structure which very easily produces fine powders. The particulate had a mean particle diameter of 150 μm, contained 30% of fine powders of 53 μm or less and many coarse particles and had a low bulk specific gravity of 0.31 g/cm³ and a wet powder water content at dehydration was 45%.

EXAMPLE 8

Emulsified latex (solid content 35%; viscosity 0.2 poise; density 1 g/cm³ and mean particle diameter 0.1 μm) of vinyl chloride obtained by emulsion polymerization was discharged into a 1% aqueous sulfuric acid solution at 30° C. from fine tubes of 0.7 mm in inner diameter and 1 cm in length at a linear speed of 100 cm/sec. The Reynolds number in the fine tube at this time was 35, and the necessary run-up distance for laminar flow was 0.16 cm. Thus, laminar flow conditions were sufficiently satisfied.

The emulsified latex discharged into the coagulation bath became soft aggregations of 500 to 700 μm having apparently coagulated surface skin. When the surface skin was gently broken, there were seen coalescent particles of 200 to 300 μm in the form of a coherent clump. The solution, as it was, was heated to 80° C. and left to stand for 10 minutes. Thereafter, the aggregations were filtered off, washed with water, dehydrated and dried to obtain particulate. This particulate had a mean particle diameter of 600 μm, contained neither fine particles of 100 μm or less nor coarse particles of 1.0 mm or more and had a high bulk specific gravity of 0.48 g/cm³ and a low wet powder water content of 13% at dehydration.

REFERENCE EXAMPLE 5

The same emulsified latex as used in Example 7 was coagulated by the conventional coagulation method, namely, by adding the emulsified latex to a 2% aqueous sulfuric acid solution so that amount of sulfuric acid was 4% per resin. The solution was heated to 80° C. to solidify the coagulated latex and this was filtered off, washed with water, dehydrated and then dried to obtain a particulate. This particulate had a mean particle diameter of 300 μm, contained 18% of fine powders of 53 μm or less, and no coarse particles of 1.0 mm or more, but had a low bulk specific gravity of 0.28 g/cm³ and a high wet powder water content of 32% at dehydration.

EXAMPLE 9

Emulsified latex (viscosity 0.1 poise and density 1 g/cm$^3$) of polybutadiene which had a solid content of 50% and a mean particle diameter of 1.0 μm was discharged into a 10% sulfuric acid coagulation bath at 70° C. from fine tubes of 0.7 mm in inner diameter and 1 cm in length at a linear speed of 50 cm/sec to obtain long string-like lumps. When surface skin of a lump was broken by a needle tip, coalescent particles of 100 to 200 μm were seen. When the solution was heated to 92° C. with agitation, lengths of the string-like lumps became 2 to 3 cm. The string-like lumps were water-washable and filterable and had a low wet powder water content of about 50% while latex coagulated by the conventional coagulation method, namely, one-time addition became crumbly and could not be washed with water nor filtered off.

EXAMPLE 10

Emulsified latex (solid content 45%, viscosity 0.1 poise and density 1 g/cm$^3$) prepared by graft copolymerization of 45% of polybutadiene with 39.1% of styrene and 15.9% of acrylonitrile was discharged into a 1% aqueous sulfuric acid solution at 25° C. from fine tubes of 1 mm in inner diameter and 190 mm in length at a linear speed of 25 cm/sec. The Reynolds number in the fine tube at this time was 25 and this sufficiently satisfied the relation of $L/D > 0.1$ Re and $L/D \geq 20$. The thus discharged strand-like product of the emulsified latex was solidified in hot water at 90° C., then dried with superheated steam of 5 kg/cm$^2$ and cut by a cutter to obtain a pellet-like product.

EXAMPLE 11

Emulsified latex (solid content 45%, viscosity 0.1 poise and density 1 g/cm$^3$) obtained by graft copolymerization of 45% of polybutadiene with 39.1% of styrene and 15.9% of acrylonitrile was discharged into a 1% aqueous sulfuric acid solution at 25° C. from fine tubes of 0.8 mm in inner diameter and 100 mm in length at a linear speed of 100 cm/sec. The Reynolds number in the fine tube was 80 which satisfied the relation $L/D > 0.1$ Re. The thus obtained strand-like product was heated to 90° C. to solidify it and then cut to obtain a pellet-like product.

REFERENCE EXAMPLE 6

Emulsified latex (solid content 45%, viscosity 0.1 poise and density 1 g/cm$^3$) obtained by graft copolymerization of 45% of polybutadiene with 39.1% of styrene and 15.9% of acrylonitrile was discharged into a 1% aqueous sulfuric acid solutin at 25° C. from fine tubes of 1 mm in inner diameter and 15 mm in length at a linear speed of 180 cm/sec. The latex diffused to a large extent in the aqueous sulfuric acid solution and strand-like product was not obtained. Reynolds number in the fine tube was 180 and L/D was 15 and the conditions of this invention were not satisfied.

EXAMPLE 12

Emulsified latex (solid content 45%, viscosity 0.1 poise and density 1 g/cm$^3$) comprising 50% of butadiene component, 20% of styrene component and 30% of methyl methacrylate and obtained by graft copolymerization of a copolymer of styrene and butadiene with styrene and methyl methacrylate was discharged into a 0.3% aqueous sulfuric acid solution from fine tubes of 0.8 mm in inner diameter and 120 mm in length at a linear speed of 35 cm/sec to coagulate the latex in the form of strands. The Reynolds number in the fine tube was 24, L/D was 150 and the conditions of this invention were sufficiently satisfied. The thus obtained strand-like product was solidified in a hot water of 80° C. and was further heated by an infrared heater into semimolten state. It was then cooled and thereafter cut into pellets by a cutter. The obtained pellets had a cylindrical form of about 1 mm in diameter and 5 mm in length and the feeding state of the pellets into injection machines was very good.

EXAMPLE 13

Emulsified latex (solid content 45%, viscosity 0.1 poise and density 1 g/cm$^3$) comprising 50% of butadiene component, 20% of styrene component and 30% of methyl methacrylate which was obtained by graft copolymerization of styrene-butadiene copolymer with styrene and methyl methacrylate was discharged into a 0.3% aqueous sulfuric acid solution from fine tubes of 1 mm in inner diameter and 200 mm in length at a linear speed of 180 cm/sec. The Reynolds number in the fine tube was 180 and the relation $L/D > 0.1$ Re was satisfied, but some fine powders were produced. The obtained strand-like product was solidified in hot water at 80° C. and cut to obtain pellets.

EXAMPLE 14

Emulsified latex of vinyl chloride (solid content 35%, viscosity 0.2 poise and density 1 g/cm$^3$ and mean particle diameter 0.1 μm) obtained by emulsion polymerization was discharged into 1% aqueous sulfuric acid solution at 30° C. from fine tubes of 1 mm in inner diameter and 200 mm in length at a linear speed of 20 cm/sec to obtain strand-like product. This product was solidified in hot water at 90° C., then dried with steam of 5 kg/cm$^2$ and cut by a cutter to obtain pellets. The obtained pellets had a cylindrical form of about 1 mm in diameter and 5 mm in length. The Reynolds number in the fine tube was 20 and L/D was sufficiently greater than 0.1 Re. Thus, the conditions of this invention were satisfied.

EXAMPLE 15

Emulsified latex of polybutadiene (solid content 50%, mean particle diameter 0.1 μm, viscosity 0.1 poise and density 1 g/cm$^3$) was discharged into a 10% aqueous sulfuric acid solution at 70° C. from fine tubes of 1.2 mm in inner diameter and 200 mm in length at a linear speed of 30 cm/sec to obtain strand-like product. The Reynolds number in the fine tube was 36 and L/D was sufficiently greater than 0.1 Re. Thus, conditions of this invention were satisfied. Thus obtained strand-like product was heated to 70° C. in hot water, further solidified and dried by a steam drier at 80° C. and cut by a cutter to obtain pellets.

EXAMPLE 16

200 parts of distilled water and 2.0 parts of potassium oleate were charged into a reactor equipped with a reflux condenser. After the reactor was blown with nitrogen, 85 parts of methyl methacrylate, 15 parts of methyl acrylate, 0.1 part of t-dodecylmercaptan, 100 parts of distilled water and 0.2 part of potassium persulfate were dropped into the reactor respectively, while the content in the reactor was stirred, and heated at 70° C. so as to perform polymerization thereby. Then mixture was further stirred for one hour with the temperature maintained at 70° C. to complete polymerization. Thus, approximately 400 parts of a copolymer latex was obtained.

The thus obtained emulsified latex was discharged into a 1% aqueous sulfuric acid solution at 70° C. from fine tubes of 0.7 mm in inner diameter and 1 cm in length at a linear speed of 50 to 100 cm/sec. Reynolds number in the fine tube at this time was 35 to 70 and run-up distance necessary for laminar flow was 0.32 cm. Thus, the conditions for forming laminar flow were sufficiently satisfied. The emulsified latex became soft aggregations of 300 to 600 μm having apparently coagulated surface skins. When the skin was gently broken by a needle tip it was found that coalescing particles of 100 to 200 μm were present in the form of a coherent clump like cod's-roe. The solution was heated, as it was, to 95° C., left to stand for 10 minutes and thereafter filtered, and solid matter was washed with water, dehydrated and then dried to obtain a particulate. This particulate had a mean particle diameter of 400 μm and contained neither fine powders of 100 μm or less nor coarse particles of 1.0 mm or more. It had a high bulk specific gravity of 0.5 g/cm$^3$ and a low wet powder water content of 15%. This was an ideal particulate.

EXAMPLE 17

A polymerization reactor equipped with a stirrer and a reflux condenser was charged with 200 parts of distilled water, 1.5 parts of dioctyl sodium sulfosuccinate, 0.2 part of ammonium persulfate, 30 parts of methyl methacrylate and 0.03 part of n-octyl mercaptan, and was blown with nitrogen. Under the nitrogen atmosphere, the mixture was heated to a temperature of 65° C. while being stirred, and the stirring was continued at this temperature for 4 hours to substantially complete the reaction.

To the aforementioned polymer latex, a mixture of 48 parts of methylmethacrylate and 12 parts of butyl acrylate was gradually added and then maintained at 65° C. for one hour while being stirred.

The thus obtained emulsified latex was discharged into a mixture of 2% aqueous sulfuric acid solution and 2% aqueous aluminum sulfate solution at 60° C. from fine tubes of 2 mm in inner diameter and 1 cm in length at a linear speed of 10 to 20 cm/sec. Reynolds number in this fine tube at this time was 20 to 40, the necessary run-up distance for laminar flow was 0.52 cm and thus the flow was sufficiently aligned to laminar flow. The emulsified latex became string-like soft aggregations of 1 to 2.5 mm having apparently coagulated surface. The aggregation was taken out and the skin was broken by a needle tip to find coalescent particles of 200 to 300 μm in the form of a coherent clump. The solution was heated to 90° C. to solidify the aggregations and left to stand for 10 minutes. Then, the solution was agitated by a propeller type agitator with two blades of 10 cm in diameter at a revolution speed of 800 rpm to disintegrate the aggregations. Apparent viscosity was 1 poise and Reynold number was about 1300. The slurry obtained by such disintegration and dispersion was heated to 95° C. to further solidify the disintegrated aggregations and they were filtered off, washed, dehydrated and dried to obtain particulate.

Thus obtained particulate had a mean particle diameter of 300 μm and contained neither fine powders of 53 μm or less nor coarse particles of 1 mm or more. It had a bulk specific gravity of 0.43 g/cm$^3$ and a low wet powder water content of 19.5% at dehydration.

EXAMPLE 18

A polymerization reactor equipped with a stirrer and a reflux condenser was charged with 250 parts of distilled water, 1.5 parts of dioctyl sodium sulfosuccinate, 0.2 part of ammonium persulfate, 25 parts of methyl methacrylate, and 0.003 part of n-octyl mercaptan. The mixture was stirred under an atmosphere of nitrogen at a temperature of 65° C. for 3 hours to substantially complete the first stage polymerization.

To the polymer latex so obtained, a mixture of 33 parts of styrene, 22 parts of n-butyl acrylate and 1.5 parts of n-octyl mercaptan was gradually added while still maintaining the reaction mixture at 65° C. over a period of 1 hour, followed by stirring for 2 hours at the same temperature to substantially complete the second stage polymerization.

Then, to the polymer latex so obtained, a mixture of 20 parts of methyl methacrylate and 0.006 part of n-octyl mercaptan was gradually added at 65° C. over a period of 30 minutes, followed by stirring for 1.5 hours at the same temperature to substantially complete the third stage polymerization. The polymer latex so obtained was discharged into the coagulant solution.

Example 17 was repeated except that fine tubes of 2 mm in inner diameter and 3 cm in length were used and linear speed in the tube was 100 cm/sec. Reynolds number in the fine tube at this time was 200 and the necessary run-up distance for laminar flow was 2.6 cm, and thus the flow was sufficiently aligned to laminar flow. The emulsified latex discharged into coagulation solution became soft aggregations of 1 to 3 mm. When surface skin was broken, coalescent particle of 150 to 300 μm in the form of a coherent clump were observed. Particulate obtained in the same manner as in Example 17 had a mean diameter of 350 μm, contained neither fine powders of 53 μm or less nor coarse particles of 1.5 mm or more and had a bulk specific gravity of 0.40 g/cm$^3$ and a low wet powder water content of 20% at dehydration.

EXAMPLE 19

In 180 parts of ion-exchanged water, which had been treated with nitrogen to displace air in the solution and placed in a reactor, were dissolved 0.45 part of boric acid, 0.045 part of anhydrous sodium carbonate, 2.0 parts of a potassium salt of a fatty acid (an emulsifier made by Nippon-Yushi Co.) and 0.15 part of potassium persulfate. To the resulting aqueous solution maintained at 70° C. was added a monomer mixture of 47.5 parts of styrene and 0.8 part of allyl methacrylate and the polymerization reaction was allowed to proceed. The pH of the latex was 8.5. The reaction mixture was maintained at the same temperature to complete the polymerization. The conversion was 96% and the average particle diameter of the resulting latex was 0.15 μm and the pH of the resulting latex was 7.8. Without the addition of a fresh emulsifier, a mixture of monomers of 52.5 parts of n-butyl acrylate, and 1.0 part of allyl methacrylate was added dropwise over a period of 90 minutes, and the polymerization reaction was allowed to proceed. After completion of the dropwise addition, the reaction mixture was further maintained at the same temperature for one hour to complete the polymerization reaction. The pH of the resulting latex was 7.6, the conversion was 98% and the resulting elastomer latex had an average particle diameter of 0.16 μm, a gel content of 89.5%, and a degree of swelling of 6.5.

The gel content and degree of swelling of the elastomer latex were determined by drying a sample of the latex in a Petri dish, immersing a portion, Wo(g), of the dried latex in methylethylketone at 30° C. for 48 hours, and measuring the weight, W₁(g), of the swollen sample and the weight, W₂(g), of the bone dry sample.

$$\text{Gd content (\%)} = \frac{W_2}{W_0} \times 100$$

$$\text{Degree of swelling} = \frac{W_1}{W_2}$$

Into a reactor were charged 70 parts (in terms of solids) of the acrylic elastomer latex obtained in the same manner as set forth, 200 parts of water (the total amount of the water in the latex plus the water used to dissolve sodium formaldehyde sulfoxylate), and 0.1 part of sodium formaldehyde sulfoxylate. To the resulting mixture, maintained at 70° C., was added dropwise a mixture over a period of 30 minutes of 15 parts of styrene and 0.05 part of cumene hydroperoxide, and the polymerization was allowed to proceed. After completion of the dropwise addition, the reaction mixture was further maintained at the same temperature for one hour to complete the polymerization reaction. To the polymerization mixture was added dropwise a mixture over a period of 30 minutes of 15 parts of methyl methacrylate and 0.05 part of cumene hydroperoxide and the polymerization reaction was allowed to proceed. After completion of the dropwise addition, the polymerization mixture was allowed to stand for 10 additional minuts to complete the polymerization reaction. The conversion was 96% or higher and the resulting graft copolymer latex had an average particle diameter of 0.185 μm.

The thus obtained graft copolymer latex was discharged into a 0.3% aqueous sulfuric acid solution at 40° C. from fine tubes of 0.7 mm in inner diameter and 1 cm in length at a linear speed of 50 to 100 cm/sec. Reynolds number in the fine tube at this time was 35 to 70, the necessary run-up distance for laminar flow was 0.32 cm and the flow in the fine tube was sufficiently aligned to laminar flow. The emulsified latex discharged into the coagulation solution became soft aggregations of 400 to 700 μm surface of which was apparently coagulated. When surface skin of the soft aggregations taken out was broken by a needle tip, it was found that coalescent particles of 200 to 300 μm were present in the form of a coherent clump. The solution, as it was, was heated to 85° C. and left to stand for 10 minutes and the aggregations were filtered off, washed with water, dehydrated and dried to obtain a particulate.

The thus obtained particulate had a mean particle diameter of 500 μm, contained neither fine particles of 100 μm or less nor coarse particles of 1.0 mm or more and, had a high bulk specific gravity of 0.43 g/cm³ and a very low wet powder water content of 17% at dehydration.

EXAMPLE 20

A mixture of 100 parts of 1,3-butadiene, 4 parts of sodium laurate, 0.5 part of n-lauryl mercaptan, 0.4 part of potassium persulfate and 180 parts of deionized water was charged into an autoclave flushed with nitrogen. While stirring, polymerization was allowed to proceed at 60° C. for 50 hours to obtain a rubber latex (E-1) of 0.09μ in average particle size. Into a flask flushed with nitrogen, were charged 50 parts (in terms of solids) of the above rubber latex (E-1), 0.8 part of sodium chloride as electrolyte, and 0.15 part of Rongalite as reducing agent. To the mixture maintained at 70° C., was added dropwise and continuously a mixture of 4 parts of ethyl acrylate and 16 parts of methyl methacrylate containing 0.08 part of cumene hydroperoxide (hereinafter referred to briefly as CHP) over a period of one hour. To the mixture, after having been kept as the same temperature for additional one hour, was added dropwise and continuously a mixture of 25 parts of styrene and 0.1 part of CHP over a period of one hour to allow the second stage graft polymerization to proceed. To the reaction mixture, which had been kept at the same temperature for additional two hours, was added dropwise a mixture of 4 parts of methyl methacrylate, 1 part of ethyl acrylate and 0.02 part of CHP over a period of 15 minutes to allow the third stage graft polymerization to proceed. The mixture was kept at the same temperature for additional one hour to complete the polymerization.

The thus obtained emulsified latex was discharged into a 0.2% aqueous sulfuric acid solution at 30° C. from fine tubes of 2 mm in inner diameter and 1 cm in length at a linear speed of 10 to 20 cm/sec. The Reynolds number in the fine tube at this time was 20 to 40, the necessary run-up distance for laminar layer was 0.52 cm and the flow in the fine tube was sufficiently aligned to laminar flow. The emulsified latex in the coagulation solution became string-like lumps of 1.5 to 3 mm the surface of which was apparently coagulated. When the surface skin of the lumps taken out was gently broken by a needle tip, coalescent particles of 200 to 300 μm in the form of a coherent clump were found. The solution was heated to 70° C. to solidify the lumps and left to stand for 10 minutes. Then, the lumps were disintegrated by a propeller type agitator of 10 cm in diameter at a revolution speed of 800 rpm. The apparent viscosity of the solution was 1 poise and the Reynolds number was about 1300. The thus disintegrated and dispersed slurry was heated to 85° C. to further solidify the disintegrated lumps, which were filtered off, washed, dehydrated and dried to obtain a particulate.

The particulate had a mean particle diameter of 400 μm, contained neither fine powders of 53 μm or less nor coarse particles of 1 mm or more and had a high bulk specific gravity of 0.44 g/cm³ and a wet powder water content of 18% at dehydration.

EXAMPLE 21

(1) Preparation of rubber latex (E-2).

|  | Parts |
|---|---|
| 1,3-Butadiene | 75 |
| Styrene | 25 |
| Divinylbenzene | 1 |
| Diisopropylbenzene hydroperoxide | 0.2 |
| Sodium pyrophosphate | 0.5 |
| Ferrous sulfate | 0.01 |
| Dextrose | 1.0 |
| Potassium oleate | 2.0 |
| Water | 200 |

Using the above receipe, polymerization was carried out in an autoclave at 50° C. The polymerization was completed in 8 hours. The average particle size of the resulting rubber latex was 0.08μ.

(2) Preparation of polymer latex (B-1) for rubber particle enlargement:

|  | Parts |
|---|---|
| Ethyl acrylate | 90 |
| Methacrylic acid | 10 |
| Potassium persulfate | 0.5 |
| Nonsoul TK-1 (a potassium soap of semihardened beef tallow, a product of Nippon Oils and Fats Co.) | 2.0 |
| Rapisol 80 (sodium octyl sulfo-succinate, a product of Nippon Oils and Fats Co.) | 1.0 |
| Water | 200 |

Using the above receipe, polymerization was carried out at 70° C. for 4 hours to obtain an emulsion latex having a pH of 6.2.

(3) Preparation of latex with enlarged particles.

In to a reactor provided with a stirrer, was charged 100 parts (as solids) of the latex (E-2). To the latex in the reactor, was added dropwise with stirring 0.3 part (as solids) of the latex (B-1) over a period of 10 seconds to obtain a latex with enlarged particles.

Graft polymerization was carried out as in Example 20 using the latex (60% solids content) with enlarged particles and the effect of monomer ratios in the first and third stages was examined. The total of the monomers grafted was 40 parts. The styrene grafted in the second stage was 50% of the total monomer. The remaining 50% was methyl methacrylate and ethyl acrylate grafted in the first and third stages.

The thus obtained emulsified latex was discharged into a 0.2% aqueous sulfuric acid solution at 50° C. from fine tubes of 2 mm in inner diameter and 1 cm in length at a linear speed of 10 to 20 cm/sec. The Reynolds number in the fine tube at this time was 20 to 40, the necessary run-up distance for laminar layer was 0.52 cm and the flow in the fine tube was sufficiently aligned to laminar flow. The emulsified latex in the coagulation solution became string-like lumps of 1.5 to 3 mm the surface of which was apparently coagulated. When the surface skin of the lumps taken out was gently broken by a needle tip, coalescent particles of 200 to 300 μm in the form of a coherent clump were found. The solution was heated to 75° C. to solidify the lumps and left to stand for 10 minutes. Then, the lumps were disintegrated by a propeller type agitator of 10 cm in diameter at a revolution speed of 800 rpm. The apparent viscosity of the solution was 1 poise and the Reynolds number was about 1300. The thus disintegrated and dispersed slurry was heated to 85° C. to further solidify the disintegrated lumps, which were filtered off, washed, dehydrated and dried to obtain a particulate.

The particulate had a mean particle diameter of 400 μm, contained neither fine powders of 53 μm or less nor coarse particles of 1 mm or more and had a high bulk specific gravity of 0.45 g/cm³ and a wet powder water content of 16% at dehydration.

EXAMPLE 22

|  | Parts |
|---|---|
| 1,3-Butadiene | 57 |
| n-Butyl acrylate | 10 |
| Styrene | 33 |

-continued

|  | Parts |
|---|---|
| Potassium oleate | 3.0 |
| Potassium persulfate | 0.4 |
| Deionized Water | 180 |

A mixture of the above composition was charged into an autoclave flushed with nitrogen and allowed to react with stirring at 60° C. for 20 hours to obtain an elastomer (E-3) (97% conversion; 0.10μ in average particle size). A graft copolymer was obtained by using the reducing agent and catalyst as used in Example 21 except that the electrolyte was not used and graft polymerizing in three stages a total of 40 parts of methyl methacrylate, n-butyl acrylate and styrene onto 60 parts of the above elastomer (E-3). The amounts of monomers (based on grand total of grafted monomers) grafted in each stage were as follows: in the first stage 34% of methyl methacrylate and 6% of n-butyl acrylate, in the second stage 50% of styrene, and in the third stage 10% of methyl methacrylate (100% in grand total).

The thus obtained emulsified latex was discharged into a 0.2% aqueous sulfuric acid solution at 30° C. from fine tubes of 2 mm in inner diameter and 1 cm in length at a linear speed of 10 to 20 cm/sec. The Reynolds number in the fine tube at this time was 20 to 40, the necessary run-up distance for laminar layer was 0.52 cm and the flow in the fine tube was sufficiently aligned to laminar flow. The emulsified latex in the coagulation solution became string-like lumps of 1.5 to 3 mm the surface of which was apparently coagulated. When the surface skin of the lumps taken out was gently broken by a needle tip, coalescent particles of 200 to 300 μm in the form of a coherent clump were found. The solution was heated to 70° C. to solidify the lumps and left to stand for 10 minutes. Then, the lumps were disintegrated by a propeller type agitator of 10 cm in diameter at a revolution speed of 800 rpm. The apparent viscosity of the solution was 1 poise and the Reynolds number was about 1300. The thus disintegrated and dispersed slurry was heated to 85° C. to further solidify the disintegrated lumps, which were filtered off, washed, dehydrated and dried to obtain a particulate.

The particulate had a mean particle diameter of 400 μm, contained neither fine powders of 53 μm or less nor coarse particles of 1 mm or more and had a high bulk specific gravity of 0.44 g/cm³ and a wet powder water content of 18% at dehydration.

What is claimed is:

1. A method for producing a particulate of a high bulk specific gravity containing substantially no finely powdered material nor a coarse powdered material from an emulsified latex from which impact modifiers or processing aids are obtainable, which comprises:

discharging an emulsified latex of a copolymer consisting of methyl methacrylate and 5 to 39% by weight of at least one other copolymerizable monofunctional vinyl monomer, said latex having a Reynolds number of 300 or less containing particles of 1 μm or less in diameter from fine tubes which satisfy the relationship: $L/D \geq 0.065$ Re, wherein L is the length of the fine tubes, D is the equivalent diameter of the fine tubes and Re is the Reynolds number, into a coagulation solution to coagulate the latex; and washing and drying the coagulated latex.

2. A method for producing a particulate of a high bulk specific gravity containing substantially no finely powdered material nor a coarse powdered material from an emulsified latex from which impact modifiers or processing aids are obtainable, which comprises:

discharging an emulsified latex of a two stage sequentially produced methyl methacrylate composite polymer consisting essentially of 1 to 49% by weight of component A polymerized from a monomer or a monomer mixture of 90 to 100% by weight of methyl methacrylate and 0 to 10% by weight of at least one copolymerizable unsaturated monomer, said component A having a glass transition temperature of at least 75° C. and a reduced viscosity ($\eta sp/C$) of 1.8 to approximately 10 as determined at 25° C. on solution in chloroform of a concentration of 0.10 g/100 ml, and; 51 to 99% by weight of component B polymerized onto or in the presence of said component A from a monomer mixture of 55 to 90% by weight of methyl methacrylate, 10 to 45% by weight of at least one alkyl acrylate having a $C_{1-8}$-alkyl group and 0 to 20% by weight of at least one unsaturated monomer copolymerizable with methyl methacrylate and the alkyl acrylate, said component B exhibiting, if polymerized in the absence of said component A, a glass transition temperature of 25° to 80° C. and a reduced viscosity ($\eta sp/C$) of 1.8 to 10 as determined at 25° C. on a solution of chloroform of a concentration of 0.10 g/100 ml, said latex having a Reynolds number of 300 or less containing particles of 1 μm or less in diameter from fine tubes which satisfy the relationship: $L/D \geq 0.065$ Re, wherein L is the length of the fine tubes, D is the equivalent diameter of the fine tubes and Re is the Reynolds number, into coagulation solution to coagulate the latex; and washing and drying the coagulated latex.

3. A method for producing a particulate of a high bulk specific gravity containing substantially no finely powdered material nor a coarse powdered material from an emulsified latex from which impact modifiers or processing aids are obtainable, which comprises:

discharging an emulsified latex of a methyl methacrylate composite polymer obtained by the two- or three-stage polymerization of 10 to 60% by weight of component A consisting essentially of, in polymerized form, 80 to 100% by weight of methyl methacrylate, 0 to 20% by weight of at least one copolymerizable monoethylenically unsaturated monomer and 0 to 2% by weight of at least one copolymerizable polyfunctional monomer having at least two ethylenically unsaturated bonds, and having a reduced viscosity ($\eta sp/C$) of at least 2.0 as determined at 25° C. on solution in chloroform of a concentration of 0.10 g/100 ml; 40 to 80% by weight of component B consisting essentially of, in polymerized form, 30 to 80% by weight of styrene and 70 to 20% by weight of at least one alkyl acrylate having a $C_{1-8}$-alkyl group or at least one alkyl methacrylate having a $C_{1-8}$-alkyl group, the component B being prepared by polymerizing monomers thereof in the presence of a preformed latex of the component A and having a reduced viscosity ($\eta sp/C$) of not greater than 1.0 as determined at 25° C. on a solution in chloroform of a concentration of 0.10 g/100 ml;

and 0 to 40% by weight of component C consisting essentially of, in polymerized form, 80 to 100% by weight of methyl methacrylate and 0 to 20% by weight of at least one copolymerizable monoethylenically unsaturated monomer and 0 to 2% by weight of at least one copolymerizable polyfunctional monomer having at least two ethylenically unsaturated bonds, the component C being prepared by polymerizing monomers thereof in the presence of a preformed latex of the components A and B, said latex having a Reynolds number of 300 or less containing particles of 1 μm or less in diameter from fine tubes which satisfy the relationship: $L/D \geq 0.065$ Re, wherein L is the length of the fine tubes, D is the equivalent diameter of the fine tubes and Re is the Reynolds number, into a coagulation solution to coagulate the latex;

and washing and drying the coagulated latex.

4. A method for producing a particulate of a high bulk specific gravity containing substantially no finely powdered material nor a coarse powdered material from an emulsified latex from which impact modifiers or processing aids are obtainable, which comprises:

discharging an emulsified latex, a latex of a graft copolymer obtained by the three-stage graft polymerization of 65 to 25 parts by weight of a monomer combination (B) comprising 12 to 57% by weight of methyl methacrylate, 1 to 24% by weight of at least one alkyl acrylate having a $C_{1-8}$-alkyl group, 80 to 40% by weight of styrene and 0 to 3% by weight of at least one polyfunctional crosslinking agent having one or more allyl groups in the molecule onto 35 to 75 parts by weight of a butadiene-base elastomer (A) containing 30% by weight or more of 1,3-butadiene units, said three-stage graft polymerization being carried out in the following way: in the first stage monomer mixture consisting of major amount of methyl methacrylate and minor amount of an alkyl acrylate or acrylates, which has a proportion of 50 to 90% by weight based on total weight of methyl methacrylate and alkyl acrylate or acrylates, and, if included in said monomer combination, a polyfunctional crosslinking agent are graft-polymerized; in the second stage, styrene is graft-polymerized; and in the third stage, the remaining 10 to 50% by weight of methyl methacrylate or methyl methacrylate and an alkyl acrylate or acrylates are graft polymerized, said latex having a Reynolds number of 300 or less containing particles of 1 μm or less in diameter from fine tubes which satisfy the relationship: $L/D \geq 0.065$ Re, wherein L is the length of the fine tubes, D is the equivalent diameter of the fine tubes and Re is the Reynolds number, into a coagulation solution to coagulate the latex; and washing and drying the coagulated latex.

5. A method for producing a particulate of a high bulk specific gravity containing substantially no finely powdered material nor a coarse powdered material from an emulsified latex from which impact modifiers or processing aids are obtainable, which comprises:

discharging an emulsified latex of a graft copolymer obtained by the graft polymerization being carried out in the following way: (1) preparing an acrylic elastomer (A) by (a) polymerizing 5 to 50% by weight of at least one vinyl monomer (i) selected from the group consisting of aromatic vinyl monomers, alkyl acrylates having a $C_{1-8}$-alkyl group and alkyl methacrylates having $C_{1-8}$-alkyl group in the presence of a polyfunctional crosslinking agent having at least one allyl group, and then (b) graft polymerizing 50 to 95% by weight of an alkyl acrylate having a $C_{1-8}$-alkyl group onto said polymerized polymer constituted of at least one vinyl monomer (i) in the presence of from 0.1 to 3 parts by weight of a polyfunctional crosslinking agent having at least one allyl group based on the weight of the sum of said at least one vinyl monomer (i) and said alkyl acrylate; (2) preparing a graft copolymer (B) by graft polymerizing from 20 to 70 parts by weight of at least one vinyl monomer (ii) selected from the group consisting of aromatic vinyl monomers, alkyl methacrylates having a $C_{1-8}$-alkyl group and vinyl cyanide compounds onto 30 to 80 parts by weight of said acrylic elastomer (A) wherein from 80% to 20% by weight of said at least one vinyl monomer (ii) is first graft polymerized onto said acrylic elastomer (A) and then graft polymerizing from 20 to 80% by weight of methyl methacrylate onto said grafted elastomer, said latex having a Reynolds number of 300 or less containing particles of 1 $\mu$m or less in diameter from fine tubes which satisfy the relationship: $L/D \geq 0.065$ Re, wherein L is the length of the fine tubes, D is the equivalent diameter of the fine tubes and Re is the Reynolds number, into a coagulation solution to coagulate the latex, and washing and drying the coagulated latex.

6. The method of claim 4, wherein prior to the graft polymerization and/or during the graft polymerization, a carboxy-containing polymer latex and/or an electrolyte are added to the butadiene-base elastomer (A).

7. The method of claim 1, which comprises forming soft aggregations composed of coalescent particles of 60 to 500 $\mu$m in diameter by the discharge of emulsified latex into coagulation solution from the fine tube, then holding the coagulation under more severe conditions and thereafter, if desired, disintegrating said soft aggregations obtained by subjecting the latex to a shearing force to obtain a particulate.

8. The method of claim 2, which comprises forming soft aggregations composed of coalescent particles of 60 to 500 $\mu$m in diameter by the discharge of emulsified latex into coagulation solution from the fine tube, then holding the coagulation under more severe conditions and thereafter, if desired, disintegrating said soft aggregations obtained by subjecting the latex to a shearing force to obtain a particulate.

9. The method of claim 3, which comprises forming soft aggregations composed of coalescent particles of 60 to 500 $\mu$m in diameter by the discharge of emulsified latex into coagulation solution from the fine tube, then holding the coagulation under more severe conditions and thereafter, if desired, disintegrating said soft aggregations obtained by subjecting the latex to a shearing force to obtain a particulate.

10. The method of claim 4, which comprises forming soft aggregations composed of coalescent particles of 60 to 500 $\mu$m in diameter by the discharge of emulsified latex into coagulation solution from the fine tube, then holding the coagulation under more severe conditions and thereafter, if desired, disintegrating said soft aggregations obtained by subjecting the latex to a shearing force to obtain a particulate.

11. The method of claim 5, which comprises forming soft aggregations composed of coalescent particles of 60 to 500 $\mu$m in diameter by the discharge of emulsified latex into coagulation solution from the fine tube, then holding the coagulation under more severe conditions and thereafter, if desired, disintegrating said soft aggregation obtained by subjecting the latex to a shearing force to obtain a particulate.

* * * * *